US008505047B2

(12) United States Patent
Liu et al.

(10) Patent No.: US 8,505,047 B2
(45) Date of Patent: Aug. 6, 2013

(54) METHOD AND SYSTEM FOR POLICY-BASED RE-BROADCAST VIDEO ON DEMAND SERVICE

(75) Inventors: Yan Liu, Hanover Park, IL (US); Bhavan Ghandhi, Vernon Hills, IL (US); Srinivasa C. Samudrala, Richardson, TX (US); Kabe Vanderbaan, Arlington Heights, IL (US); Jing Zhang, Hanover Park, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 304 days.

(21) Appl. No.: 12/951,014

(22) Filed: Nov. 20, 2010

(65) Prior Publication Data

US 2012/0131612 A1    May 24, 2012

(51) Int. Cl.
*H04N 7/10* (2006.01)
*H04N 7/025* (2006.01)
(52) U.S. Cl.
USPC ............... 725/35; 725/34; 725/36; 725/116; 725/146; 705/1.1; 705/14.43
(58) Field of Classification Search
USPC ............ 725/34–36, 116, 146; 705/1.1, 14.43
See application file for complete search history.

(56) References Cited

U.S. PATENT DOCUMENTS

| | | | |
|---|---|---|---|
| 6,965,889 B2 | 11/2005 | Serrano-Morales et al. | |
| 2003/0028451 A1* | 2/2003 | Ananian | 705/27 |
| 2003/0110067 A1* | 6/2003 | Miller et al. | 705/8 |
| 2004/0088199 A1 | 5/2004 | Childress et al. | |
| 2004/0176968 A1* | 9/2004 | Syed et al. | 705/1 |
| 2006/0224613 A1 | 10/2006 | Bermender et al. | |
| 2007/0112717 A1 | 5/2007 | Serrano-Morales et al. | |
| 2007/0260476 A1* | 11/2007 | Smolen et al. | 705/1 |
| 2009/0125413 A1* | 5/2009 | Le Chevalier et al. | 705/26 |
| 2009/0138258 A1 | 5/2009 | Neale | |
| 2009/0165078 A1* | 6/2009 | Samudrala et al. | 726/1 |
| 2009/0172760 A1 | 7/2009 | Lindsley et al. | |
| 2009/0172761 A1 | 7/2009 | Lindsley et al. | |
| 2009/0271214 A1 | 10/2009 | Kandasamy et al. | |
| 2009/0320078 A1* | 12/2009 | Pulver | 725/62 |
| 2010/0250267 A1* | 9/2010 | Brenner et al. | 705/1.1 |
| 2012/0054163 A1* | 3/2012 | Liu et al. | 707/694 |

OTHER PUBLICATIONS

Vasilecas, O., and A. Smaizys, "The framework: an approach to support business rule based data analysis," Seventh International Baltic Conference on Databases and Information Systems, Los Alamitos, California: IEEE Computer Society Press, 2006, pp. 141-147.

* cited by examiner

*Primary Examiner* — Jason Salce
(74) *Attorney, Agent, or Firm* — Barbara R. Doutre

(57) ABSTRACT

A content provider broadcasts content to subscribers through a content distribution system. The content distribution system operator can capture broadcast content in accordance with policies established by the content provider and make the content available subsequent to the original broadcast in accordance with applicable business policies. Business policies are created by the content provider by modifying template information models which have associated rules. The content distributor stores the business policies and evaluates rules indicated by the business policies against attributes of a content asset to determine availability of the content asset.

9 Claims, 4 Drawing Sheets

METHOD AND SYSTEM FOR POLICY-BASED RE-BROADCAST VIDEO ON DEMAND SERVICE

BACKGROUND

The invention relates generally to media distribution systems, and more particularly to enforcement of agreements between media asset owners and media distributors for delivery of media assets to end consumers.

The delivery of audio-visual media is well known and in widespread use. Among the most common means for delivering such media to end consumers are community access television (CATV), often referred to as "cable TV," and more recently, internet provider television (IPTV). Typically broadcasters and other media owners transmit media content according to a programming schedule. Media content, such as television shows, is presented to viewers at a prescribed time according to the programming schedule.

When viewers or media consumers are unable to watch a given show at the scheduled broadcast time, they typically miss the show, or either have to wait for a re-broadcast of the show, or record the show and watch it at a more convenient time. Video recording devices for home use are often used to time shift a selected show so the viewer can watch the show at a later, more convenient time. This, or course, requires the viewer to have a video recording device, and to be able to set up and operate the device. Some people may find the cost of purchasing a video recording device to be prohibitive. Others may find the set up and programming of such devices to be difficult, particularly if the device has to be re-programmed after it loses power. Furthermore, recording broadcast media doesn't alleviate other issues, such as when there are issues in the broadcast resulting in loss of picture or audio, as can occasionally happen.

To address the problems associated with viewer-operated video recording equipment, some media distributors have developed so called "video on-demand" (VOD) services. VOD allows a customer to select a media asset, such as a television show or episode, to view at a convenient time. Media assets are made available by the service provider pursuant to agreements with the asset owners. In early VOD service the asset content that was made available was older content that may have been broadcast more than once by the time it was made available for VOD service, or had been available in other venues previously. This was due to the fact that asset owners, while having legal agreements in place, had little to no direct control of the asset once it was in the hands of the distributor, and so asset owners were hesitant to allow more recent content be made available. Since then other solutions have been contemplated which provide some control over assets for VOD, such as including lifecycle instructions in metadata of a given asset when the asset is transmitted into a broadcast network for broadcast to end viewers. The asset owners can then dictate usage conditions such as lifecycle management via the metadata, relying on distributors to implement appropriate systems to recognize and conform to the lifecycle instructions.

While including lifecycle instructions in the metadata allows asset owners to dictate a measure of control over a given asset, it is still dependent on media distributors' system design. Each asset requires the distributor's system to examine the lifecycle instructions for that asset and determine whether the asset can be provided for VOD viewing. Content owners would prefer more control and flexibility with regard to asset lifecycle management for VOD purposes. Accordingly, there is a need for a means by which asset owners can more closely control asset usage at the distributor's system.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE DRAWINGS

Figure 1:
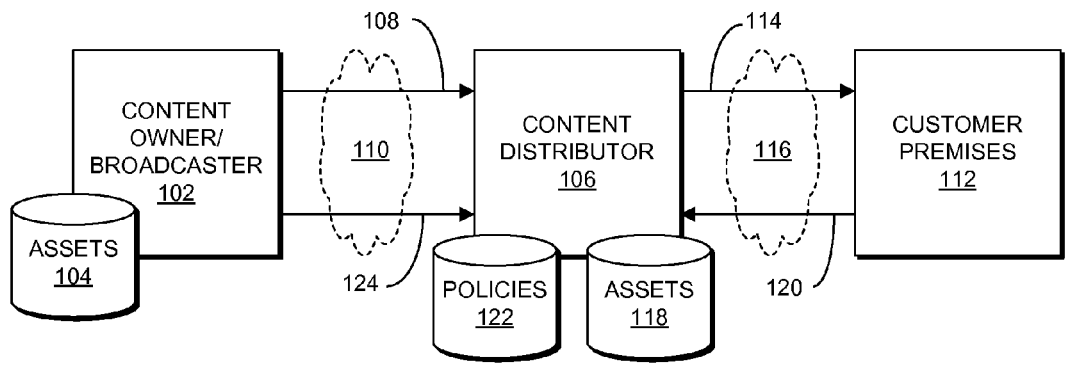
FIG. 1 shows a general system schematic diagram of an audio-visual content system, in accordance with an embodiment.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Embodiments of the invention avoid the problems associated with the prior art by allowing the dynamic creation and authoring of business policies template models which bridges the gap between the high level expression of agreements between business entities, and the low level execution logic that carries out the decisions associated with the performance of business operations. A policy authoring tool allows for the creation and generation of policy template models which can be associated with rules for carrying out logical operations. The policy template models specify attribute names and attribute types which define a sharable set of major constituents of all business policies that can be modeled by a template. The policy authoring tool is further used to create event condition action and/or condition action (ECA/CA) rules to support policy template models, Based on a policy template model, a business policy template information model, which may be referred to as just template information model, can be created which specifies constraints for the attributes and attribute types, and which identifies a target group or category of applicable content assets or other business related objects, and further have a customized user interface representation. A template information model is used as a basis to instantiate a business policy via an authoring tool. Values for the attributes and attribute types are assigned or filled into the template information model to represent a business policy. The values are derived from agreements between businesses or otherwise dictated by the owner of a business object which is distributed or processed by another business subject to the policy. The business policy, as instantiated in a template information model, can be serialized and stored as a business policy template model object in a business policy store accessible by the business entity subject to the policy. A policy engine operated by the business subject to the policy detects events or conditions which trigger the application of the policy, and loads the rules associated with the target of the policy. The serialized version of the business policy is retrieved and deserialized so that the attribute and attribute type values and parameters can be loaded into the rules and processed to determine the disposition of the target business object.

Referring to FIG. 1, there is shown a general system schematic diagram of an audio-visual content system 100, in accordance with an embodiment. A content owner or broadcaster 102 controls and owns a plurality of assets 104. The content owner can be, for example, a television network, and the assets 104 can include audio-visual content assets such as television shows. The assets are scheduled to be broadcast out to viewers at particular times. The broadcast is accomplished through one or more content distributors 106. Assets are transmitted over a channel 108, which can be through a network 110 which can include satellite communication components, optical fiber network components, as well as more conventional wired telecommunication network components. The content distributor typically distributes content (assets) to customer premises 112 or other customer or subscriber locations, as scheduled, via a channel 114 over a distribution network 116. Among the more common distribution networks are Community Access Television (CATV), often referred to as "cable TV." Distribution can also be performed over pack-based data networks, such as those using Transmission Control Protocol and Internet Protocol (TCP/IP) standards, including the Internet, such as Internet Provider Television (IPTV). For standard broadcast of content, the content essentially passes through the content distributor 106 from an origination point such as the content broadcaster 102 to the customers 112 at a scheduled broadcast time. The customers can then view the broadcast content by selecting a channel on which the content is broadcast. The channel can be a CATV channel, an IPTV uniform resource locator (URL), or equivalent.

In order to facilitate video on-demand (VOD) services, the content distributor 106 can store copies of broadcasted content assets in a local asset repository 118. The content can be copied directly from the broadcast channels, or by other equivalent means. Acquiring the content assets and making them available for VOD service is performed in accordance with agreements between the owners of the content 102 and the content distributors 106. The VOD service is for recently broadcast content and is intended to be a replacement for devices such as digital video recorders, and is therefore different and operates under different agreements than conventional pay per view type VOD operation. Generally, the recently broadcast content can be captured by the content distributor 106 and made available for a period of time at no additional charge to the customer, or for a nominal fee. A VOD guide can be generated by the content distributor 106 to allow a customer to make a selection and transmit a corresponding VOD request on a VOD request channel 120. The guide can reflect what is presently available in the asset repository 118, which is dictated by business policies stored in a business policy repository 122. The business policies reflect the parameters and conditions for making the corresponding recently broadcast assets available for the VOD service, and can be directly authored by the content owner via policy channel 124. The content distributor 106 processes the policies using associated rules for each target asset or category of target assets to determine, for example, whether an asset can be captured or acquired, the duration which acquired assets can be made available, and so on. These parameters can be modified based on characteristics of the asset such as what time the asset is broadcast (primetime, late night, etc.), whether the asset is an episode of a particular series or show, whether it is premium content, and other such characteristics. The business policy repository can contain policies provided by multiple different content owners or broadcasters as the content distributor typically distributes content from a plurality of different broadcasters. A policy engine operated at the content distributor 106 evaluates the rules against the corresponding business policies in the format of serialized policy template model instances that are retrieved from the business policy repository to determine whether the target asset or group of assets is available or continues to be available for access by which group of user.

Figure 2:
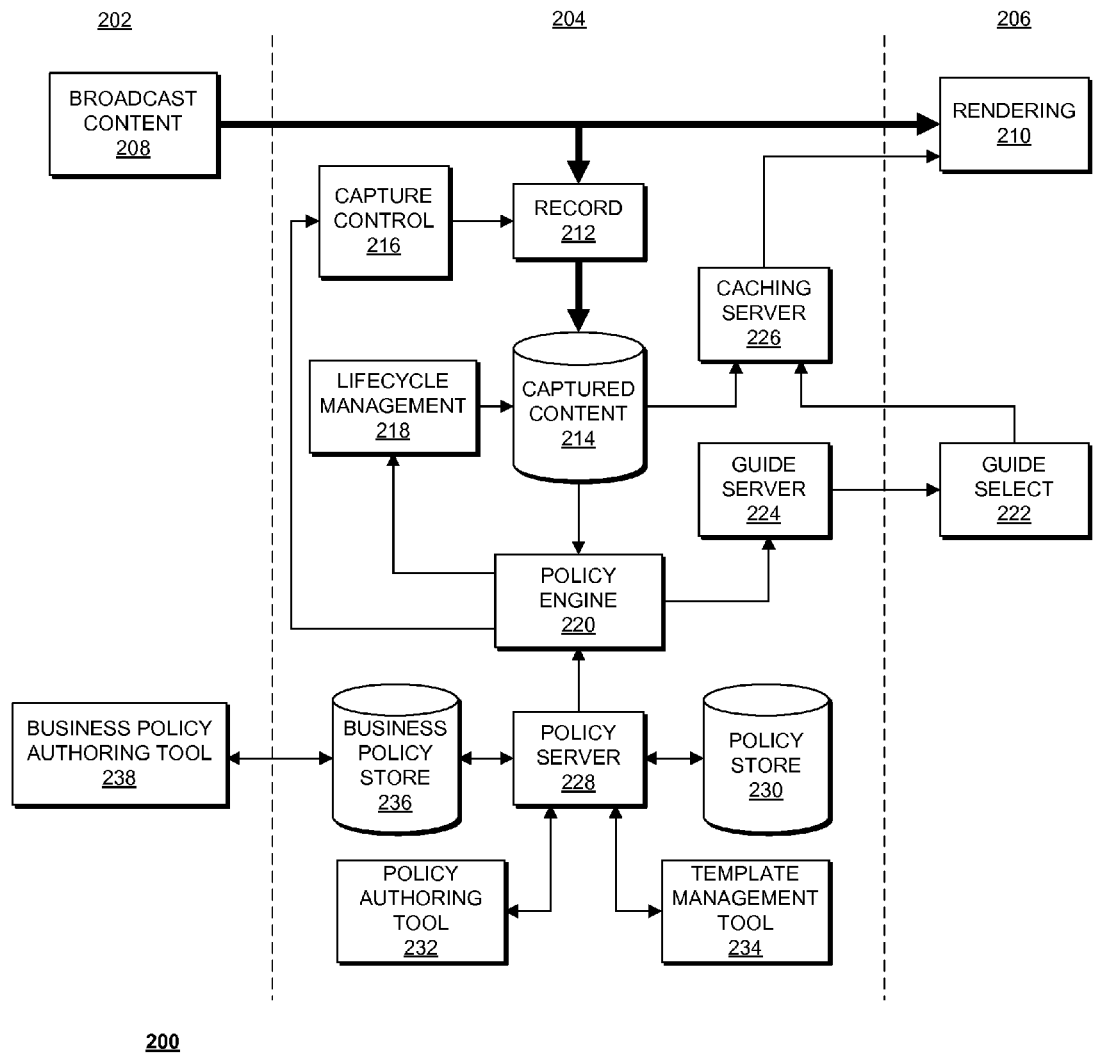
FIG. 2 shows a more detailed system schematic diagram of an audio-visual content delivery system, including a video on-demand operation for recently broadcast content subject to corresponding policies, in accordance with an embodiment.

FIG. 2 shows a more detailed system schematic diagram of an audio-visual content delivery system 200, including a video on-demand operation for recently broadcast content subject to corresponding policies, in accordance with an embodiment. The diagram shows three sections; a content broadcaster section 202, and content distributor section 204, and a customer section 206. These sections can correspond to content owner 102, distributor 106, and customer 112 of FIG. 1, respectively. The content broadcaster controls broadcast content 208, which can be audio-visual content such as television programming, i.e. television shows. The broadcast content 208 is transmitted to the customer or end consumer 206 through the content distributor 204. The content is received by a rendering device 210, such as a television receiver, CATV receiver, set top box, and so on so that the content can be seen and heard. As the content passes through the content distributor network 204, the content is subject be being recorded by a recording function 212 which is controlled by a capture control function 216. The recording function can be implemented by any device or component which can convert the broadcast signals from the broadcaster 202 to non-transitory form for storage in the captured content repository 214. The capture control function operates response, at least in part, to a policy engine 220, which evaluates policies according to associated rules to determine which broadcast content can be acquired or captured. Similarly, the content that is captured and stored in the captured content repository 214 is managed by a lifecycle management function 218, which is also operated responsive to the policy engine 220. The lifecycle management function 218 removes content from the captured content repository 214 when an evaluation of applicable policies and associated rules indicate the content distributor is no longer authorized to make a given captured content asset available for the VOD service for recently broadcast content.

The VOD service can be facilitated by providing a guide to customer. A guide lists the content available in the captured content repository that is available for VOD service, and can further list content broadcast schedule for the present time and for near future times. The guide is provided to the customer to be displayed at the customer's premises to, among other functions, allow the customer to select content items to be transmitted to the customer for viewing. A guide server 224 collects and formats information as to what content is available for VOD service and delivers it to the customer in a form such as enhanced Electronic Programming Guide (EPG) format. The customer's equipment can then display the guide and feed selections back to a caching server 226. To determine what content is available, the guide server 224 can query the policy engine 220, or other function that can determine what is presently available in the captured content repository 214. Alternatively, the guide server can rely on the policy engine 220 and lifecycle management function 218 to maintain the content in the capture content repository 214, and simply query the captured content repository to determine its contents. Once the customer selects a viewing choice, the selection is transmitted back to the caching server 226 over an uplink channel of the distribution network. The caching server 226 then commences streaming the selected content from the captured content repository 214 to the requesting customer.

The policy engine 220 communicates with a policy server 228 which supports policy and rules development. The policy engine can be embodied on a computing hardware platform having components such as processors, memory, input/output components, as well as operating system software and application software for implementing the functionality described herein. The policy server 228 is operably connected to a policy store 230, which stores policy template models and rules for performing policy logic operations. The policy server 228 supports a policy authoring tool 232 which can present a graphical user interface to a user for building template models, specifying rules, and associate template models with the ECA/CA rules. The policy server 228 includes computer hardware components such as processors, memory, input/output components, as well as operating system software and application software for implementing the functionality described herein. Using the policy authoring tool a user can specify attributes and attribute types for a template model. The template model can be expressed, for example, in a document using eXtensible Markup Language (XML) where each attribute can be defined as an XML element or tag and each attribute type can be a type of an XML element. The policy authoring tool 232 can further be used to author programmable rules such as Condition/Action (CA) or Event/Condition/Action (ECA) rules. The policy authoring tool can be implemented on a computing hardware platform having components such as processors, memory, input/output components, as well as operating system software and application software for implementing the functionality described herein. It can provide user interface function for Create, Replace, Update, and Delete (CRUD) operations for template models and programmable rules, as well as the association of template models with programmable rules that reference the template models in the rule specification. The policy authoring tool 232 can be used to create rules and template models dynamically, at runtime, while the system is actively processing policy evaluations, VOD requests, guide generation, content capture, and captured content lifecycle management, among other active operations that can be performed. The automated creation of template models can be facilitated using any programming language such as JAVA, C++, C#, etc. In using the policy authoring tool, and user, such as a rules developer, selects the various attributes and associated rules to generate a template model.

The rules and template models are stored in a policy store 230, where they can be further accessed using a template management tool 234. The template management tool 234 is used by a user such as a business expert who serves as a policy administrator for the content distributor 204. Using the template management tool 234 a user can select a template model and build a template information model by customizing the template model with different UI components, domain specific constraints, and application to a target group or target object. The constraints and other limits can be described or otherwise set for the attributes and attribute types of the template model. Once a template information model is created, it can be stored in the policy store 230. The target object can be referenced by content broadcaster, as well as title or other attributes. The template management tool can present a template model in a GUI of an application which can be displayed on a client device. The GUI view of the template model can provide tools and options to customize a template model to produce a template information model substantially as described.

A template information model serves as the basis for a business policy which can be created by the business user using a business policy authoring tool 238. The business policy authoring tool can be served from the content distributor, or it can be instantiated at the content broadcaster's location and communicate with the content distributor. Alternatively, the business policy authoring tool can be used by a user at the content distributor. A user or operator uses the business policy authoring tool to load a template information model, such as from the policy store 230, into the business policy authoring tool 238. The desired template information model can be found, for example, by the content or object to which it is targeted. Once loaded, the business policy authoring tool can display a GUI representation of the template information model, along with tools for filling in the attribute values. The values are dictated by the content broadcaster in accordance with agreements between the content broadcaster and content distributor. Once the business policy is finalized, it can be serialized as an instantiation of a template model object, and stored in a business policy store 236, or equivalent storage, in serialized form. The business policy therefore is associated with a set of ECA/CA rules, specifies a content target or group of targets, further specifies particular attributes and attribute types, as well as the values for those attributes and attribute types to be evaluated by the associated rules under different contexts. The business policies can therefore be created and implemented in runtime, while the content distributor system and content broadcast system are operating.

In operation, the policy engine retrieves a business policy (as a serialized template information model) from the business policy store 236 for application to its associated rules. A triggering event can be defined which causes the policy server 228 to load the business policy into the policy engine 220, along with its associated rule set. The policy engine 220 then deserializes the business policy and applies the attribute values to the rules, which are then evaluated to determine a disposition of the target content for the present context.

Figure 3:
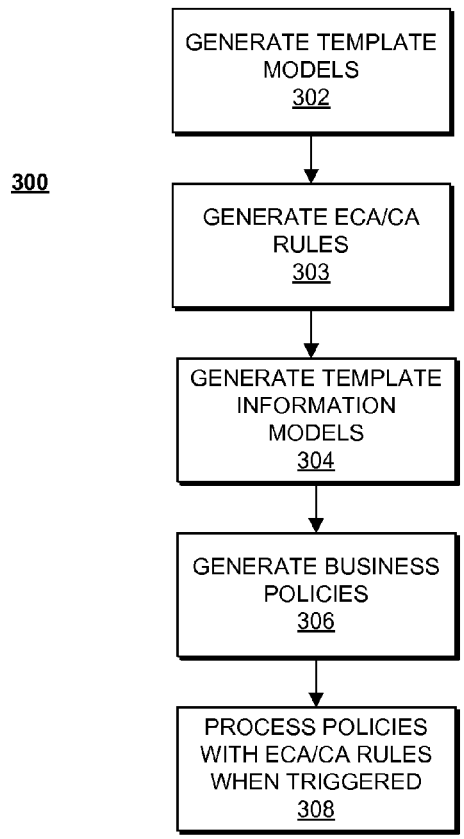
FIG. 3 shows a flow chart diagram for a method of generating and implementing business policies, in accordance with an embodiment of the invention.

FIG. 3 shows a flow chart diagram for a method 300 of generating and implementing business policies, in accordance with an embodiment of the invention. The present figure provides an overview of the process as described in reference to FIG. 2. The process begins by generating one or more template models (302). Each template model specifies attributes and attribute types. The template models can be created by a rules developer using a policy authoring tool. The rules developer can also generate a set of ECA/CA rules to be associated with the template models (303). From a template model, a template information model is generated (304). A template information model identifies a target, which can be a single content object, or a group of content objects. A template information model can further specify constraints on the attributes specified in the template model attributes. The template information model can be generated by a business expert user using a template management tool. The template information model is used as the basis for generating a business policy (306). The business policy is generated by providing values for the attributes and attribute types in a template information model. The business policy can then be serialized and stored in a business policy store or repository. Once generated, the business policy is invoked upon occurrence of one or more defined trigger events (308). The trigger events can include scheduler events, guide generation events, lifecycle maintenance events, and so on. Alternatively, the business policy can be invoked by the service body which directly interacts with the policy engine. Once a policy engine is deployed and started, it communicates with the policy server to retrieve and update policy template models and ECA/CA rules to build the rule base at runtime whenever there is a change. The policy server deserializes the corresponding business policy, and provides it to the policy engine for evaluation over the associated ECA/CA rules. The values contained in the business policy are fed into the rules as facts, and additional facts can be provided, such as the present time, date, and so on, which can establish or represent a particular context. Once invoked for rule execution, the policy engine evaluates the rules to determine a disposition of the target content object or objects.

Figure 4:
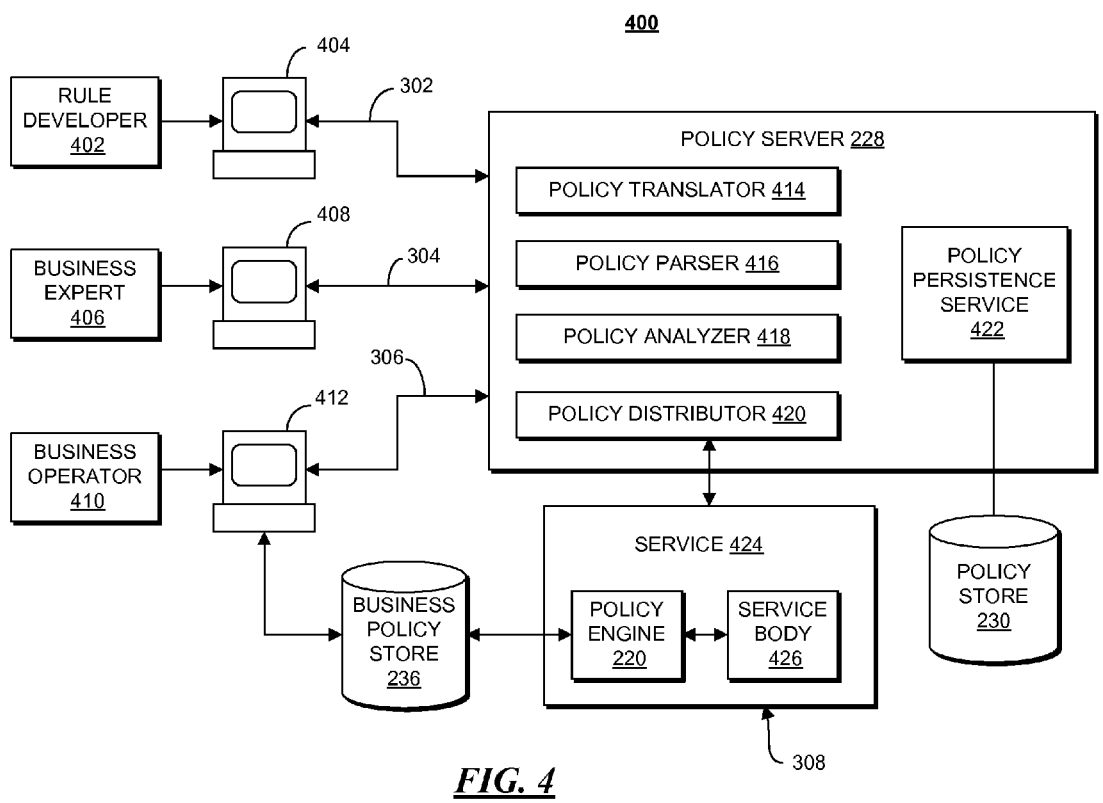
FIG. 4 shows a schematic diagram of a policy creation, authoring, and implementing system, in accordance with an embodiment.

FIG. 4 shows a schematic diagram of a policy creation, authoring, and implementing system 400, in accordance with an embodiment. A rule developer 402 uses a client terminal 404 on which a policy authoring tool is instantiated to generate (302) one or more template models, as well as to define rules which are associated with the template model, and which will apply to business policies ultimately produced from the template model. The template model and associated rules can be provided to a policy server 228 and stored in a policy store 230. The template model specifies attributes and attribute types. For example, the template model can specify an "Acquire" attribute, which can have a default value of "NO," indicating the target cannot be acquired by the content distributor for the recently broadcast VOD replay service contemplated herein. The template model can specify a "visibility" attribute indicating whether the target can be acquire, and at least one attribute to define the lifespan of the target indicating a time period for which the target can be made available. The visibility attribute can be variable or contextual, such as by a class of subscription or other criteria indicating the type of viewer that can see the content target as being available to them. Furthermore a "transcode" attribute can be specified indicating whether the target content should be transcoded from one media format to another media format, and there can be at least one attribute that indicates or specifies a transcoding process applicable to the target for a required media format. Once implemented as a business policy, however, the content broadcaster can change the default value to another value indicating the content distributor is allowed to capture the target content. The template model can further specify a "Span" attribute, indicating the time period after the broadcast which the content can be made available for re-broadcast VOD service. The "Span" attribute can be represented in a form that is compliant with a standard set by the International Organization for Standardization, know by the acronym "ISO."

In addition to defining the attributes and attribute types, the user 402 creates rules to be associated with various template models. The user 402 can create ECA/CA policies organized in packages to support created template models, the rules can be also stored in the policy store 230. The user further can generate domain models, which can be associated with or otherwise referenced by the rules packages. Finally, the user 402 can associate the template model with particular ECA/CA rules.

The template model is the basis for a template information model, which can be generated (304) by a user such as a business expert 406 at a client device 408 which is in communication with the policy server 228 using a template management tool. Generating the template information model includes selecting a template model from the policy store 230, defining constraints and limits for the attributes and attribute values, including default values, creating enumerated values, and so on. Using the template management tool the user 406 can also specify the GUI representation of the template information model, including labeling attributes in recognized business language and organizing the attributes. The user can then store the template information model in the policy store 230. The user 406 can also define a target group by specifying attributes and attribute values with logical operators that correspond to those target groups in target data models. The composed target group target data models can also be stored in the policy store 230. Finally, template information model is associated with a target group. Where the template management tool is implemented as a GUI tool, the template information model can be graphically moved and dropped onto a target data model, and the tool registers an association in the policy store 230. The template information models can also be placed in the business policy store 236 for easy access by the content broadcaster.

The content broadcaster or business operator 410 can access the business policy store 236 via a client terminal device 412 to generate (306) a business policy from a template information model. The business user 410 selects an appropriate template information model, based on the associated target group and defined attributes, and commences to provide values for the attributes. The user saves the business policy in the business policy store. The attribute and attribute type values indicate, for example, whether the target content can be acquired, and the span of time which it can be made available for the re-broadcast VOD service. The business user 410 can also query the rules applicable to a specific target for validation. Once the business policy is completed at the business policy authoring tool, it can be serialized and saved in the business policy store.

Once the business policy is created and in place in the business policy store 236, the policy server 228 can access the business policy. To facilitate operation, the policy service comprises several functions, including a policy translator 414, and policy parser 416, a policy analyzer 418, a policy distributor 420, and a policy persistence service 422. The policy translator 414 can be used to translate policies generated by other authoring tools in other policy languages into the internal format of programmable rules. The policy parser 416 ensures compliance with accepted formatting conventions as well as extracting attribute and attribute type values. The policy analyzer 418 mainly checks for potential conflicts and inconsistencies between policies. The policy distributor 420 distributes template models, rules, and other related artifacts to various services for disposition. For example, a service 424 can be instantiated as a result of a triggering event relating to one or more content targets. In response the policy server 228 retrieves the applicable business policy, deserializes it, and provides it to the policy engine 220 along with the applicable rules. The service 424 performs the functions of block 308 of FIG. 3, where the policy engine inserts deserialized business policies in the form of instances of template models as facts into working memory of the policy engine to be evaluated using the rules that are pre-associated with the template models, and commences to perform the logical operations specified by the rules. The policy engine can interact with a service body 426 which specifies particular contextual data such as present time and date, scheduler input, and other such information which can be applied to the rules in addition to the attribute and attribute type values contained in the business policy.

Figure 5:
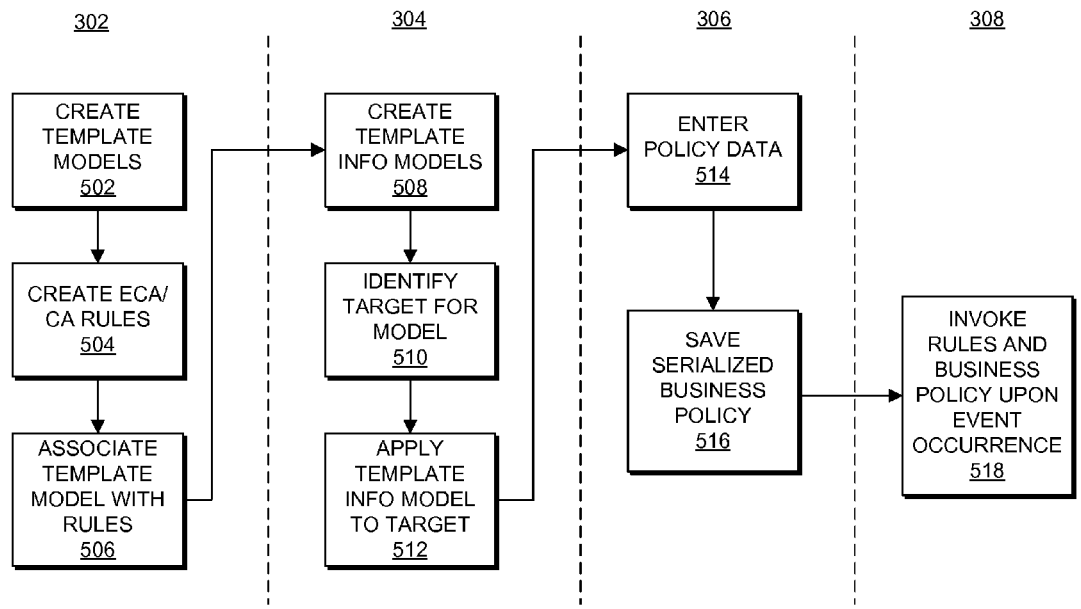
FIG. 5 shows a work flow diagram for creating, authoring, and implementing business policies, in accordance with an embodiment.

FIG. 5 shows a work flow diagram 500 for creating, authoring, and implementing business policies, in accordance with an embodiment. The diagram is arranged into four different sections corresponding to FIG. 3. In a first section, the template model is generated (302). In a second section a template information model is generated (304). In a third section a business policy is generated (306), and in a fourth section the business policy is used in operation to determine the disposition of a target content object for purposes of the re-broadcast VOD service.

As described, the template model is created 502, along with rules 504. The rules are associated with the template model 506. The template model forms the basis for a template information model. Constraints and limits are specified for the attributes and attribute values named in the template model 508. A target is identified 510, and the target is associated with the template information model 512. To create a business policy mode, and template information model is selected, based on the associated target and attributes, and the policy data is entered or otherwise assigned to the attributes and any other data fields 514. The business policy can then be serialized 516 and then saved in the business policy store. Once completed, the business policy can be invoked 518 upon occurrence of a triggering event defined for the policy.

Figure 6:
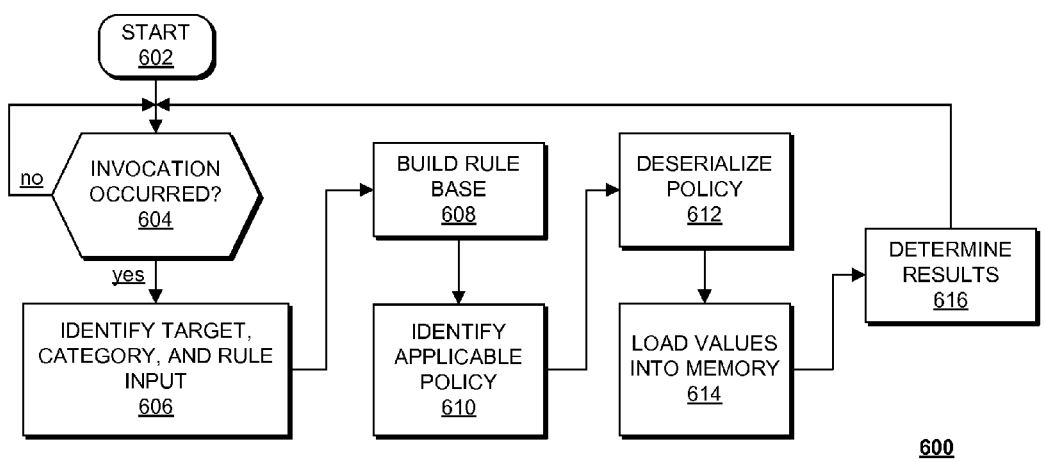
FIG. 6 shows a flow chart diagram of a method for implementing a business policy, in accordance with an embodiment.

FIG. 6 shows a flow chart diagram of a method 600 for implementing a business policy, in accordance with an embodiment. At the start 602, the content distributor system is operating, and providing re-broadcast VOD service. A content owner or equivalent agent has generated a business policy, which is accessible for application. The method 600 commences responsive to invocation or other trigger event 604. A variety of different events can be defined as trigger events, including guide generation, scheduler operation, invocation of the policy engine by a service body, and so on. A service body is a software component that implements a set of operations as a service provided to other components in the content distribution system. A policy engine typically resides in a service body and can be invoked by the service body via events or directly through its interface. For example, the service body can be a content capture controller or a transcoding service.

In one embodiment a service body can choose to invoke the policy engine directly. The trigger event indentifies 606 a target content, the category or context of the event, and the applicable rules. A rule base is built 608 upon starting the policy engine, and the policy engine keeps the rule base current during operation by communication with the policy distribution service of the policy server. The applicable policy or policies are identified 610 and then deserialized 612. The attribute and attribute type values, and well as any contextual values, are loaded into the working memory of the policy engine as "facts" 614, where the logical operations specified by the rules are then executed to determine a disposition of the target content.

As described herein, one of ordinary skill will realize that the invention can be embodied as a method for managing business policies for media assets. The method can be include processes for generating a template model specifying attributes and attribute types for each attribute, generating a set of event-condition-action or condition-action (ECA/CA) rules for processing the attributes and attribute types of the template model. The method can further include a process for generating a template information model from the template model, including specifying constraints of the attributes and identifying a target group for the template information model. The method can further include a process for generating a business policy from the template information model by assigning values to the attributes and attribute types, wherein the values are derived from an agreement representing legal rights regarding the target group. The method can further include a process for invoking the business policy and the set of ECA/CA rules responsive to an event, wherein the attribute values and attribute type values are applied to the set of ECA/CA rules to determine a disposition of the target.

The invention can further be embodied as a method of managing media content in a media content distribution system. The method can include a process for providing template models from the content distribution system to a content provider via a business policy authoring tool, the template models having associated rules and defining attributes. The method can further include a process for receiving from the content provider at the content distribution system a business policy based on a template model including attribute values for the attributes. The method can further include a process for storing the business policy in a business policy store of the content distribution system. The method can further include a process for receiving content assets from the content provider during an initial broadcast of the content assets to subscribers through the content distribution system. The method can further include a process for determining the availability of the content assets for further use by the subscribers subsequent to the initial broadcast of the content assets based upon the business policy.

The invention can be further embodied as a content distribution system which includes a policy store which stores template models, the template models defining content attributes and having associated rules. The content distribution system can further include a business policy store which stores business policies, each business policy implemented as an instantiation of a template information model based on a template model and defining constraints for the attributes and identifying target content assets. The content distribution system can further include a content store which stores content assets subject to at least one of the business policies. The content distribution system can further include a policy engine executed on computing hardware which evaluates the availability of a content asset based on an applicable business policy as indicated by at least one rule associated with the applicable business policy.

This invention can be embodied in other forms without departing from the spirit or essential attributes thereof. Accordingly, reference should be made to the following claims, rather than to the foregoing specification, as indicating the scope of the invention.

What is claimed is:

1. A method for managing business policies for media assets, comprising a series of generating and invoking steps occurring in computing hardware:

generating a template model specifying attributes and attribute types for each attribute;

generating a set of event-condition-action or condition-action (ECA or CA) rules for processing the attributes and attribute types of the template model;

generating a template information model from the template model, including specifying constraints of the attributes and identifying a target group for the template information model;

generating a business policy from the template information model by assigning values to the attributes and attribute types, wherein the values are derived from an agreement representing legal rights regarding the target group; and invoking the business policy and the set of ECA or CA rules responsive to an event, wherein the attribute values and attribute type values are applied to the set of ECA or CA rules to determine a disposition of a target of the target group, wherein invoking the business policy occurs in response to operating a re-broadcast video on-demand service.

2. The method of claim 1, further comprising storing the business policy in a business policy store which is accessible by both a content broadcaster and a content distributor.

3. The method of claim 1, wherein generating the template model and template information model are performed by a content distributor, and wherein the template model, template information model, and the set of rules are stored in a policy store of the content distributor.

4. The method of claim 1, wherein operating the re-broadcast video on-demand service comprises generating a video on-demand guide which is presented to customers of the re-broadcast video on-demand service, wherein generating the video on-demand guide dynamically applies business policies to determine at least one target to be shown in the video on-demand guide.

5. The method of claim 1, wherein generating the template model comprises defining lifecycle attributes of the target, which include at least an "Acquire" attribute indicating whether the target can be acquired, and at least one attribute to define the lifespan of the target indicating a time period for which the target can be made available.

6. The method of claim 1, wherein generating the template model comprises defining a visibility attribute of the target which indicates whether the target can be made visible, and at least one attribute to define a visibility window indicating a time period for which the target can be made visible to certain types of viewers.

7. The method of claim 6, wherein the visibility attribute is variable depending on a customer type.

8. The method of claim 1, wherein generating the template model comprises defining the viewing attributes of a target, which include at least a "transcode" attribute indicating whether the target should be transcoded, and at least one attribute that specifies a transcoding process applicable to the target for a required media format.

9. A method for managing business policies for media assets, comprising a series of generating and invoking steps occurring in computing hardware:

generating a template model specifying attributes and attribute types for each attribute;

generating a set of event-condition-action or condition-action (ECA or CA) rules for processing the attributes and attribute types of the template model, wherein generating the ECA or CA rules includes defining logical operations for evaluating the ECA or CA rules;

generating a template information model from the template model, including specifying constraints of the attributes and identifying a target group for the template information model;

generating a business policy from the template information model by assigning values to the attributes and attribute types, wherein the values are derived from an agreement representing legal rights regarding the target group; and invoking the business policy and the set of ECA or CA rules responsive to an event, wherein the attribute values and attribute type values are applied to the set of ECA or CA rules to determine a disposition of a target of the target group, and wherein invoking the business policy comprises performing the logical operations while evaluating the ECA or CA rules.

* * * * *